United States Patent
Hoang et al.

(10) Patent No.: US 9,332,447 B2
(45) Date of Patent: May 3, 2016

(54) BASE STATION AND METHOD OF OPERATING THE SAME

(75) Inventors: Anh Tuan Hoang, Singapore (SG); Haiguang Wang, Singapore (SG); Wai Leong Yeow, Singapore (SG); Jaya Shankar S/O Pathmasuntharam, Singapore (SG); Chee Ming Joseph Teo, Singapore (SG); Shoukang Zheng, Singapore (SG)

(73) Assignee: Agency for Science, Technology and Research, Singapore (SG)

( * ) Notice: Subject to any disclaimer, the term of this patent is extended or adjusted under 35 U.S.C. 154(b) by 85 days.

(21) Appl. No.: 14/117,175

(22) PCT Filed: May 11, 2012

(86) PCT No.: PCT/SG2012/000166
§ 371 (c)(1),
(2), (4) Date: Feb. 11, 2014

(87) PCT Pub. No.: WO2012/154130
PCT Pub. Date: Nov. 15, 2012

(65) Prior Publication Data
US 2014/0148185 A1    May 29, 2014

(30) Foreign Application Priority Data

May 12, 2011  (SG) ................................. 201103402-2
Jul. 18, 2011  (SG) ................................. 201105179-4

(51) Int. Cl.
*H04B 7/14*    (2006.01)
*H04W 24/04*   (2009.01)
*H04B 7/02*    (2006.01)
(Continued)

(52) U.S. Cl.
CPC ............... *H04W 24/04* (2013.01); *H04B 7/026* (2013.01); *H04W 72/0426* (2013.01); *H04W 72/1263* (2013.01); *H04W 88/08* (2013.01); *H04W 92/20* (2013.01)

(58) Field of Classification Search
CPC .............................. H04W 40/22; H04W 80/04
See application file for complete search history.

(56) References Cited

U.S. PATENT DOCUMENTS

2008/0002631 A1 *  1/2008  Ramachandran ............. 370/338
2008/0186950 A1 *  8/2008  Zhu et al. ...................... 370/350
(Continued)

FOREIGN PATENT DOCUMENTS

SG   201101079-0   2/2011
SG   201101531-0   3/2011
(Continued)

OTHER PUBLICATIONS

Godfrey, 802.16n System Requirements Document including SARM Annex, IEEE 802.16n-10/0048r3 (2011).
(Continued)

*Primary Examiner* — Justin Lee
(74) *Attorney, Agent, or Firm* — K. David Crockett, Esq.; Niky Economy Syrengelas, Esq.; Crockett & Crockett, PC (57) ABSTRACT

The present invention is directed to a base station including a transceiver configured to communicate with another base station using a radio resource, wherein the radio resource is allocated to the base station to serve communication devices located in a radio cell operated by the base station. A method of operating a base station is also disclosed.

20 Claims, 3 Drawing Sheets

(51) Int. Cl.
 *H04W 72/12* (2009.01)
 *H04W 72/04* (2009.01)
 *H04W 88/08* (2009.01)
 *H04W 92/20* (2009.01)

(56) References Cited

U.S. PATENT DOCUMENTS

2009/0196177 A1* 8/2009 Teyeb et al. .................... 370/231
2013/0035033 A1* 2/2013 Sanneck et al. ................... 455/9

FOREIGN PATENT DOCUMENTS

| SG | 201101534-4 | 3/2011 |
| SG | 201101535-1 | 3/2011 |
| SG | 201101537-7 | 3/2011 |
| SG | 201101771-2 | 3/2011 |
| SG | 201103402-2 | 5/2011 |

OTHER PUBLICATIONS

IEEE Standards Association, Part 16: Air Interface for Broadband Wireless Access Systems, IEEE Standard for Local and Metropolitan Area Networks IEEE Std 802.16m (IEEE 2011).

* cited by examiner

BASE STATION AND METHOD OF OPERATING THE SAME

CROSS-REFERENCE TO RELATED APPLICATION

This application makes reference to and claims the benefit of priority of the Singapore application numbers 201103402-2 and 201105179-4 filed on May 12, 2011 and Jul. 18, 2011, respectively. The content of said applications filed on May 12, 2011 and Jul. 18, 2011 is incorporated herein by reference for all purposes, including an incorporation of any element or part of the description, claims or drawings not contained herein and referred to in Rule 20.5(a) of the PCT, pursuant to Rule 4.18 of the PCT.

TECHNICAL FIELD

Various embodiments generally relate to base stations, in particular, base stations used for extending network coverage or recovering from network failures, in particular, networks operating under IEEE 802.16 standards.

BACKGROUND

In IEEE 802.16 standards, base stations (BS) do not communicate with each other over the air interface. Instead, communication between BSs is often supported though backbone (or backhaul) connections. In all existing cellular standards (e.g., 2G, 3G, WiMAX, LTE, LTE-Advanced), base stations may only be linked to each other through dedicated connections such as optical cable or microwave radio.

However, there are situations when it is useful to allow BSs to exchange data/signaling over the radio channel. For example, when one BS experiences backhaul failure and needs to rely on another for core network connectivity, exchange of data/signaling between the two BSs over the radio channel may be required.

In IEEE 802.16.1a system requirements, single point of failure such as high-reliability base station (HR-BS) or high-reliability relay station (HR-RS) shutdown or backhaul disruption may occur.

Thus, there is a need to provide base stations seeking to address at least the problem mentioned above, for example, to maintain network connectivity and to allow BS to BS communications during single point of failure.

SUMMARY OF THE INVENTION

In a first aspect, the present invention relates to a base station including a transceiver configured to communicate with another base station using a radio resource, wherein the radio resource is allocated to the base station to serve communication devices located in a radio cell operated by the base station.

According to a second aspect, the present invention relates to a method of operating a base station, the method including communicating with another base station using a radio resource, wherein the radio resource is allocated to the base station to serve communication devices located in a radio cell operated by the base station.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. The dimensions of the various features/elements may be arbitrarily expanded or reduced for clarity. In the following description, various embodiments of the invention are described with reference to the following drawings, in which.

DETAILED DESCRIPTION

The following detailed description refers to the accompanying drawings that show, by way of illustration, specific details and embodiments in which the invention may be practiced. These embodiments are described in sufficient detail to enable those skilled in the art to practice the invention. Other embodiments may be utilized and structural, and logical changes may be made without departing from the scope of the invention. The various embodiments are not necessarily mutually exclusive, as some embodiments can be combined with one or more other embodiments to form new embodiments.

In order that the invention may be readily understood and put into practical effect, particular embodiments will now be described by way of examples and not limitations, and with reference to the figures.

Various embodiments may provide a method for extending network coverage or recovering from a network failure.

Various embodiments may provide base station (BS) to BS communications being achieved with one BS switching between the roles of a BS and a relay station (RS).

In general, there may be many ways for a base station to perform the functionalities of a relay station. One straight forward way is for the base station to become or function as a normal (or standard) relay station, and to perform only the limited set of functionalities of a relay station. For example, in the context of ieee 802.16.1a requirements, a base station can switch to a relay station and subsequently needs to disassociate all of its subordinate relay stations (as a relay station cannot support another relay station).

Various embodiments may provide a base station to perform the functionalities of a relay station while still continuing to support its subordinate relay stations. This may be achieved by the arrangement of frame preamble the base station should transmit, and the new frame structure the base station should follow, and the additional signaling messages defined.

Various embodiments may provide designs for networks based on IEEE 802.16m-2011 baseline.

Various embodiments may provide specific design for IEEE 802.16.1a systems following the IEEE 802.16m-2011 baseline. For example, HR-Network may support HR-BS communication with another HR-BS in order to support the relaying function to provide continuous network connectivity. As used herein, HR-Network refers to High-Reliability Network and HR-BS refers to High-Reliability Base Station. IEEE 802.16.1a requires HR-BS to be able to perform the role of RS. This is mainly for the case when an HR-BS loses its backhaul connection, and need to communicate with another HR-BS (that has backhaul) in order to continue supporting subordinate stations (HR-MS, HR-RS) under its coverage.

IEEE 802.16.1a standard shall be developed based on the latest 802.16m-2011 specifications with the design taking 802.16m-2011 as the baseline. More specifically, Time Division Duplex (TDD) may be employed. For example, upon losing backhaul and having to perform Time-division Transmit/Receive (TTR) relay operation to connect to another HR-BS, an HR-BS may still support its subordinate relay stations by switching between a BS operation mode and a RS operation mode. As used herein, TTR is a relay mechanism where transmission to subordinate station(s) and reception from the superordinate station, or transmission to the superordinate station and reception from subordinate station(s) is separated in time.

Various embodiments may further provide an efficient process of HR-BS changing role to HR-RS (to talk to the other HR-BS).

Various embodiments may provide multi-hop communications without introducing a separate interface between relay stations (RS). For example, HR-BS operating as HR-RS may also be used to support multi-hop communication to far-away (distant) high reliability mobile stations (HR-MS).

Various embodiments may provide a network entity, or may be called a dual-role BS, which is capable of perform the roles of a BS and an RS in a time-multiplexing manner. When the dual-role BS communicates with another BS (or may be called a super-ordinate BS), the dual-role BS acts essentially as an RS. On the other hand, when the dual-role BS communicates with its subordinate stations, including mobile stations (MSs) and relay stations (RSs), it acts essentially as a BS. The subordinate MSs/RSs may or may not be aware of the fact that the dual-role BS is capable of switching roles (or operation modes) and when it actually switches roles. The dual-role BS may negotiate/inform its role-switching capabilities and behavior with/to its super-ordinate/subordinate stations during network entry or normal operation.

To support multi-hop relaying of data between a BS and an MS, multiple dual-role BSs may be linked in a topology of $$DR\_BS\_\{0\} \Leftrightarrow DR\_BS\_\{1\} \Leftrightarrow \ldots \Leftrightarrow DR\_BS\_\{i\} \Leftrightarrow DR\_BS\_\{i+1\} \Leftrightarrow \ldots \Leftrightarrow DR\_BS\_\{N-1\} \Leftrightarrow DR\_BS\_\{N\} \Leftrightarrow MS$$

where $DR\_BS\_1$, $DR\_BS\_\{N-1\}$ are dual-role BSs. $DR\_BS\_\{0\}$ may be either a normal (single-role) BS or a dual-role BS. $DR\_BS\_\{N\}$ may be either a normal (single-role) RS or a dual-role BS. When $DR\_BS\_\{i\}$ and $DR\_BS\_\{i+1\}$ communicate with each other, $DR\_BS\_\{i\}$ assumes the role of a BS while $DR\_BS\_\{i+1\}$ assumes the role of an RS. Role switching happens in time and may be negotiated among stations.

Figure 1:
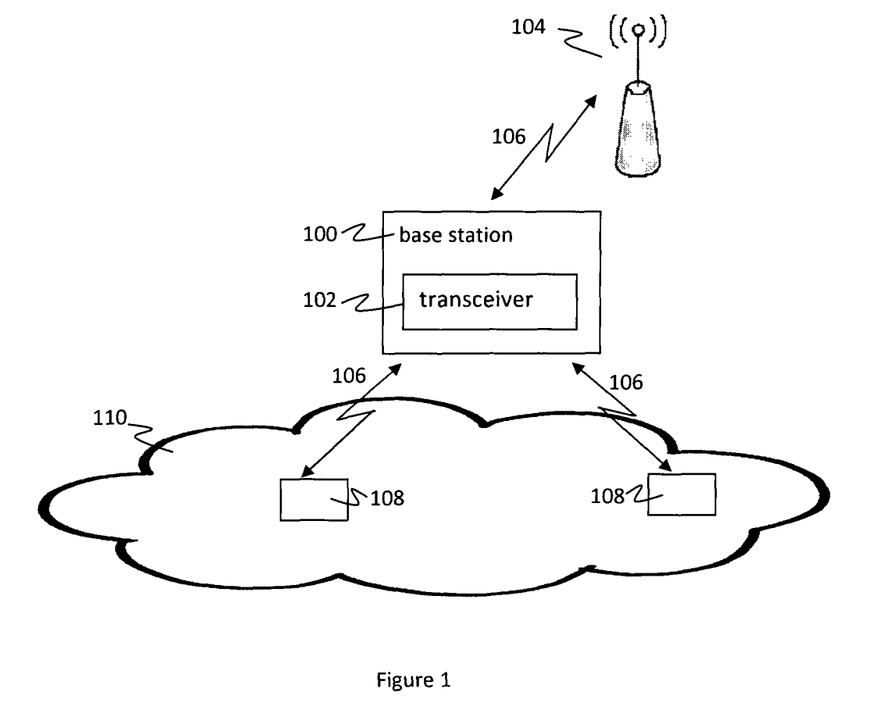
FIG. 1 shows a schematic block diagram of a base station, in accordance to various embodiments.

In a first aspect, a base station is provided as shown in FIG. 1. In FIG. 1, a base station 100 includes a transceiver 102 configured to communicate with another base station 104 using a radio resource 106, wherein the radio resource 106 is allocated to the base station 100 to serve communication devices 108 located in a radio cell 110 operated by the base station 100.

In the context of various embodiments, the term "base station" refers to a communication device that is capable of providing access to a communication network. The base station 100 may be used to communicate with subscriber stations, for example, for providing wireless connectivity including but not limited to access points and the like. The base station 100 may also serve a relay station or a plurality of relay stations in a communication network. For example, the base station 100 may be configured to relay data between a core network of the communication network and the other base station 104 of the communication network. The base station 100 may be but is not limited to, for example, an access point, or a personal basic service set central point.

For example, the base station 100 may be a macro base station.

In the context of various embodiments, the term "transceiver" refers to a combination transmitter/receiver. For example, a transceiver may be the transmitter and receiver combined into a single package. In general, a transceiver comprises both transmitting and receiving capabilities and functions.

The transceiver 102 may transmit or receive voice or data services.

In various embodiments, the communication devices 108 may include communication terminals or relay stations or both.

As used herein, the term "communication terminal", for example, any one of the communication terminals, may refer to a machine that assists data transmission, that is sending and/or receiving data information. Accordingly, the communication terminal may also be generally referred to as a node. For example, the communication terminal may be a communication terminal of the plurality of communication terminals. The communication terminals may be, for example but not limited to, a station, or a mobile station (MS), or a subscriber station, or a substation, or a port, or a mobile phone, or a cellular phone. A terminal may be understood as an endpoint (terminal point) of a communication connection, e.g. a communication device that is used by one of the participant (e.g. by a human user) of the communication.

In an embodiment, the communication terminals may include mobile stations or subscriber stations or both.

In an embodiment, the communication terminals may include at least one of 802.16 (e.g. 802.16-2009) subscriber stations, or 802.16 (e.g. 802.16-2009) mobile stations, 802.16m mobile stations or 802.16.1a mobile stations.

In one embodiment, the communication terminals may comprise MSs of the cellular mobile communication system. In other embodiments, the MSs may be any of a Personal Digital Assistant (PDA), a cellular phone, a Personal Communication Service (PCS) phone, a Global System for Mobile (GSM) phone, a Wideband Code Division Multiple Access (WCDMA) phone, a Mobile Broadband System (MBS) phone, etc. The term 'MS' may interchangeably be referred to as the term 'User Equipment (UE)', 'Subscriber Station (SS)', 'Mobile Subscriber Station (MSS)', 'mobile terminal', 'Advanced Mobile Station (AMS)', etc.

The term "operate" may refer to "function", or "work", or "communicate".

As used herein, the term "communicate" refers to send or transmit or receive.

The term "receive" may interchangeably be referred but not limited to as listen, or collect, or detect. For example, "receive" may further include to determine that the received request is correctly or incorrectly obtained. When correctly obtained, the received request is identical or at least substantially similar as the transmitted request. Such determining of a correct or incorrect request may be performed by error detections, for example, cyclic redundancy check (CRC).

In an embodiment, the relay stations may include 802.16.1 a relay stations.

The term "radio resources" may refer to any portion of a resource or resources that may be needed for acquisition of a service in a communication network. For example, the radio resources 106 may be but are not limited to networks, frequency bands, carriers, time slots, logical channels.

The term "serve" refers to providing a service. In this context, a service may be, for example, a transmission or a reception of control messages or data.

The term "allocate" generally refers to being determined or pre-determined, being assigned, being arranged. Allocation may be performed dynamically.

The term "radio cell" refers to an geographical coverage area that is served by a base station or relay station. Within such a geographical coverage area, communication devices can access to the communication network through the serving base station or relay station.

In various embodiments, the base station 100 may operate in a communication network and may be configured to access a core network of the communication network through the other base station. For example, the base station 100 may be able to access the core network through the help of the other base station that has direct access to the core network.

As used herein, the term "communication network" generally refers to a wireless communication network.

The term "communication network" also includes any method or medium for transmitting (or receiving) information from one communication entity to another. The communication network is formed via a communication connection among communication entities (or may be referred to as nodes). A "communication connection" may generally refer to a link to provide information transfer between one entity and another entity.

The term "communication network" may be interchangeably referred to as a "communication system". For example, a communication network may include a plurality of communication devices (e.g., the communication devices 108).

In various embodiments, the other base station 104 may be configured to operate another radio cell.

In an embodiment, the other radio cell may be a neighbouring cell of the radio cell 110.

As used herein, the term "neighbouring cell" may refer to adjacent cell or abutting cell or at least partially overlapping cell.

The term "relay" refers to transmit signal or data received by a relay station.

As used herein, the term "signal" refers to a communication signal. The signal may be a message, which may be a short information sent from one entity, for example, the base station 100, to at least another one entity, for example, the communication devices 108. A signal may be a packet or a cluster.

For example, a signal may comprise precisely formatted data that is sent and received by nodes and may represent a request, report, or an event. The signal may be comprised in or encoded in or indicated in another signal.

The "core network" refers to a switching network used to carry signaling traffic to and from radio access networks or access subsystems. The core network may include switching centers and gateways that interconnect radio access networks and the network backbone, and, or the Internet.

In an example, the other base station 104 may be stationary or fixed. This is in contrast to, for example, a mobile station which is not stationary. The other base station 104 may include a plurality of other base stations. The other base station 104 may interchangeably be referred to as another peer base station.

Figure 2:
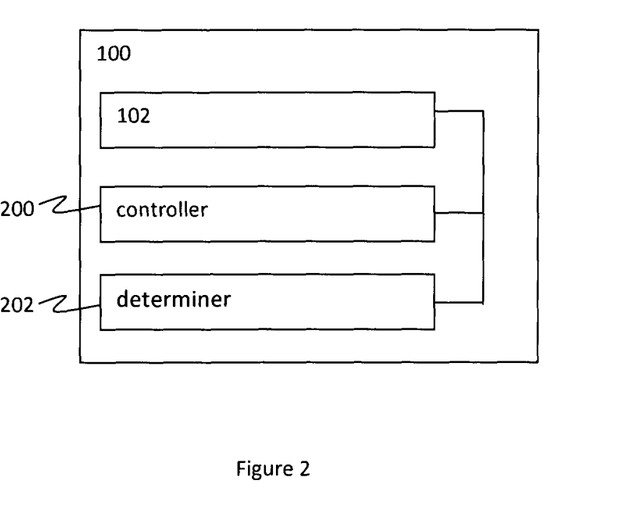
FIG. 2 shows a schematic block diagram of a base station, in accordance to various embodiments.

Various embodiments may provide the base station 100 further including a controller 200 (as shown in FIG. 2) configured to switch between a first mode and a second mode; and wherein in the first mode, the radio resource 106 is used by the base station 100 to serve the communication devices 108; and wherein in the second mode, the transceiver 102 is configured to access a core network of the communication network through the other base station, for example, the other base station 104.

In the context of various embodiments, the term "controller" may generally refer to any device, system, frame or bitframe of a control/signaling message or part thereof that controls or changes at least one operation. In some embodiments, the controller 200 may be included in the transceiver 102.

The term "switch" generally refers to change, or reversibly change. "Switch" does not refer to hard switch or physical switch or performing a change of structural features. The term "switch" may be referred to as operational switch such as dual-role operation.

In the context of various embodiments, the first mode and the second mode are operation modes and may also be referred to as the base station operation/mode and the relay station operation/mode, respectively.

In certain context, there may be a blur distinction between a relay station and a base station. Essentially, these two network entities can both support multiple subscriber stations, and the logical operation of a relay station and a base station may be relatively similar (for example, in the case of 802.16m systems). Prior to 802.16n systems, a base station is not allowed to act as a relay station for another base station. A relay station may be seen as a "low-end" base station, which may arguably refer such "low-end" base station to act as a relay station for a "high-end" base station. In any case, it should be appreciated and understood that some difference in the capabilities of a base station and a relay station exists. For example, for 802.16m systems, a base station can support a subordinate relay station, but a relay station cannot support another subordinate relay station.

The "relay station" and "base station" used in this context may be distinguished by their respective capabilities as described above.

In various embodiments, the controller 200 may be configured to switch between the first mode and the second mode in a frame-by-frame basis.

For example, a first frame includes the controller 200 being in the first mode, the next frame includes the controller 200 being in the second mode, the following frame includes the controller 200 being in the first mode, the subsequent frame includes the controller 200 being in the second mode, and so on.

In another example, a first and second frames include the controller 200 being in the first mode, the next single frame includes the controller 200 being in the second mode, the following frame includes the controller 200 being in the first mode, the subsequent three frames include the controller 200 being in the second mode, and so on.

For example, the base station 100 may be configured to switch in the first mode for a frame or for a number of consecutive frames.

For example, the base station 100 may be configured to switch in the second mode for a frame or for a number of consecutive frames.

In various embodiments, the controller 200 may be configured to switch between the first mode and the second mode in a periodic manner.

For example, a first frame includes the controller 200 being in the first mode, the next two frames include the controller 200 being in the second mode, the following frame includes the controller 200 being in the first mode, the subsequent two frames includes the controller 200 being in the second mode, and so on.

Various embodiments may provide the base station 100 further including a determiner 202 (as shown in FIG. 2) configured to determine whether to switch in the first mode or the second mode.

In the context of various embodiments, the term "determiner" may refer to a computer-related entity, for example, hardware, a combination of hardware and software, software, or software in execution. The determiner 202 may be, but is not limited to, a process running on a processor, a processor, an object, an executable, a thread of execution, a program, and a computer that may be operable in the network component. As used herein, the term "determine" may refer but is not limited to "compute", "verify", "check", "evaluate", "establish", or "assess".

In various embodiments, the transceiver 102 may be configured to serve the communication devices 108 using the radio resource 106 in the second mode.

In an embodiment, the transceiver 102 may be configured to send to at least one of the communication terminals 106 or the other base station 104 a control message comprising information on when the base station 100 operates in the first mode or on when the base station 100 operates in the second mode.

The term "send" may refer but is not limited to transmit.

In an embodiment, the control message may be sent when the base station 100 enters the communication network (i.e., during network entry) or when the base station 100 is operating in the first mode or when base station 100 is operating in the second mode.

In an embodiment, the control message may be sent to the other base station 104 through a backhaul connection of the communication network.

A "backhaul connection" may refer to a dedicated connection which links base stations to each other or to the core network, for example, via optical cable or microwave radio.

In another embodiment, the control message may be sent via the radio resource 106.

Various embodiments may provide in the second mode, the transceiver 102 being configured to transmit a downlink (DL) message to the communication terminals during a downlink (DL) access period (or zone).

In the context of various embodiments, the term "downlink" refers to transmission from a superordinate entity, for example, the base station 100, to a subordinate entity, for example, the communication terminals.

In an embodiment, the transceiver 102 may be configured to receive the DL message from the other base station 104 during a downlink (DL) relay period (or zone).

In an embodiment, the transceiver 102 may be configured to transmit downlink (DL) data to the relay stations or to transmit to the relay stations a message indicating that uplink (UL) data is to be transmitted during the downlink (DL) relay period (or zone).

As used herein, the term "indicating" includes, but not be limited by, specifying, showing, implying, revealing, notifying, publishing, or registering.

The DL access period and the DL relay period are time periods or slots allocated to perform the respective tasks.

In an example, either the DL access period or the DL relay period may include a time period for the base station to switch from transmitting to receiving mode. This time period may be referred to as Relay-Transmit-to-receive Transition Interval (R-TTI).

Various embodiments may provide in the second mode, the transceiver 102 being configured to receive an uplink (UL) message from the communication devices 108 during an uplink (UL) access period (or zone) or an uplink (UL) relay period (or zone).

The UL access period and the UL relay period are time periods or slots allocated to perform the respective tasks.

In an embodiment, the transceiver 102 may be configured to transmit the UL message to the other base station 104 or to transmit to the relay stations a further message indicating that the DL message is to be received during the UL relay period (or zone).

In an example, either the UL access period or the UL relay period may include a further time period for the base station to switch from receiving to transmitting mode.

This further time period may be referred to as Relay Receive-to-transmit Transition Interval (R-RTI).

Figure 3:
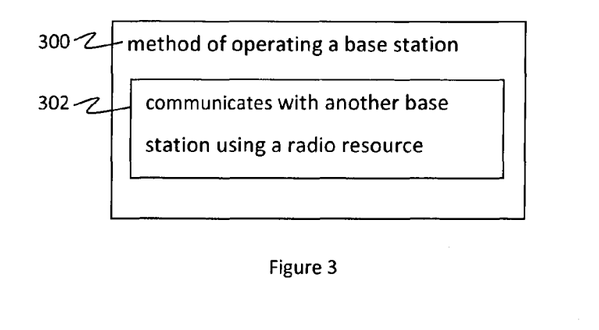
FIG. 3 shows a schematic block diagram of a method of operating a base station, in accordance to various embodiments.

In a second aspect, a method of operating a base station 300 is provided as shown FIG. 3. At 302, the base station communicates with another base station using a radio resource, wherein the radio resource is allocated to the base station to serve communication devices located in a radio cell operated by the base station.

In this context, the base station may refer to the base station 100, the other base station may refer to the other base station 104, the radio resource may refer to the radio resource 106, the communication devices may refer to the communication devices 108 and the radio cell may refer to the radio cell 110 of FIG. 1.

The term "base station", "communicates", "radio resource", allocated", "serve", "communication devices", "radio cell" and "operated" may be as defined above.

In various embodiments, the method 300 may further include operating the base station in a communication network and allowing the base station to access a core network of the communication network through the other base station.

The term "relaying" may relate to the term "relay" as defined above. The term "core network" may be as defined above.

In various embodiments, the method 300 may further include switching between a first mode and a second mode, wherein in the first mode, the radio resource is used by the base station to serve the communication devices; and wherein in the second mode, the transceiver is configured to communicate with the other base station in order to access the core network of the communication network.

The term "switching", "first mode" and "second mode" may be as defined above.

Embodiments described in the context of one of the methods or devices are analogously valid for the other method or device. Similarly, embodiments described in the context of a method are analogously valid for a device, and vice versa.

In the following examples, the terms "Advanced Mobile Station (AMS)" and "Advanced Relay Station (ARS)" are used to refer to IEEE 802.16m-2011 mobile and relay stations, respectively; the term "Mobile Station (MS)" is used to generally refer to IEEE 802.16-2009, IEEE 802.16m-2011, and IEEE 802.16.1a mobile station.

Dual-Role Operation of HR-BS

Figure 4:
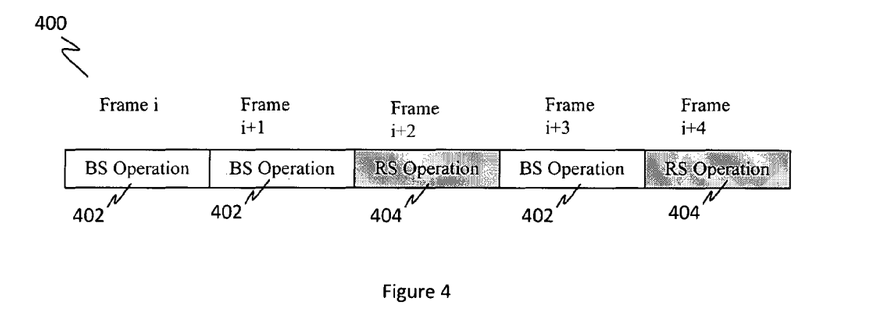
FIG. 4 shows an exemplary (non-limiting) illustration of BS/RS role-switching in a frame-by-frame basis for a dual-role HR-BS, in accordance to various embodiments.

FIG. 4 shows an exemplary (non-limiting) illustration of BS/RS role-switching in a frame-by-frame basis for a dual-role HR-BS.

In FIG. 4, a dual-role HR-BS, for example, the base station 100 of FIG. 1, is able to switch between BS Operation 402 and RS Operation 404 in a frame-by-frame basis 400. The BS Operation 402 and the RS Operation 404 may refer to the first mode and the second mode, respectively, as defined above.

These role-switching activities may be dynamically negotiated between the dual-role HR-BS and its super-ordinate HR-BS, for example, the other base station 104 of FIG. 1. This negotiation may happen when the dual-role HR-BS starts associating with the super-ordinate HR-BS and may be altered through control messages exchanged between the two HR-BSs during operation.

In one example, the dual-role HR-BS starts network entry, together with negotiation of modes/roles of operation (i.e., pattern of BS Operation 402 and RS operation 404 modes) with its super-ordinate HR-BS prior to losing backhaul connection. This means network entry and operation negotiation between the two HR-BSs may be exchanged through the backhaul connection.

In another example, the dual-role HR-BS starts network entry, together with negotiation of modes/roles of operation (i.e., pattern of BS Operation 402 and RS operation 404 modes) with its super-ordinate HR-BS after losing backhaul connection. In this case, network entry and operation negotiation may be exchanged through the radio channel (with the dual-role HR-BS assuming the RS Operation 404 mode).

In a further example, the topology configuration and mode of operation of several dual-role HR-BSs may be set at network planning (e.g., to support multi-hop coverage).

In one embodiment, the modes/roles of operation of the dual-role HR-BS may be configured in a manner such that the mode/role switching assumes a periodic pattern of BS Operation 402 for T_bs consecutive frames, followed by RS Operation 404 for T_rs consecutive frames. T_bs may be set to 0. The value of T_bs, T_rs may be negotiated between the dual-role HR-BS and its super-ordinate HR-BS.

The behaviours of the HR-BS in each mode/role of operation are described as follow.

BS Operation

When a dual-role HR-BS assumes BS Operation 402, it only communicates with its subordinate stations (MS, RS) and is not available to receive from or transmit to its super-ordinate HR-BS.

The manner in which the dual-role HR-BS controls and communicates with its subordinate HR-MSs/HR-RSs may be viewed as the same as that of a normal (standard) single-role HR-BS. It assumes a frame structure and Physical/Media Access Control (PHY/MAC) configurations as a normal (standard) single-role HR-BS. In the case of IEEE 802.16.1a, this may include transmitting normal (standard) Primary/Secondary Advance Preambles (PA/SA Preambles), Superframe Header (SFH), A-MAP, and other signaling/data in the downlink (DL) and uplink (UL) subframes. This however does not exclude the possibility to modify the IEEE 802.16m-2011 SFH, A-MAP, and other downlink control messages for ieee 802.16.1a HR-BS.

During normal BS Operation 402, the dual-role HR-BS serves IEEE 802.16-2009, 802.16m-2011, and 802.16.1a subordinate mobile/relay stations. It may transmit control messages regarding its role-switching behaviours toward its 802.16.1 a subordinate stations. Essentially, these control messages indicate to the subordinate stations when the HR-BS will switch to RS Operation 404 and what the specific behaviours of the HR-BS are during the RS Operation 404. The 802.16-2009 and 802.16m-2011 subordinate stations are not expected to understand the control messages containing the role-switching information transmitted by the dual-role HR-BS.

The super-ordinate HR-BS would be aware of when the dual-role HR-BS assumes the BS Operation 402, so that it will not schedule DL/UL transmissions to/from the dual-role HR-BS. The super-ordinate HR-BS is not expected to know the specific configuration of the dual-role HR-BS during the BS Operation 402. In other words, when the dual-role HR-BS transmits to or receives from its subordinate stations during the BS Operation 402, it does so independently to the super-ordinate HR-BS.

RS Operation

When a dual-role HR-BS assumes RS Operation 404, it communicates with the super-ordinate HR-BS and with the subordinate MSs/HR-MSs. The dual-role HR-BS may or may not communicate with its subordinate ARSs/HR-RSs during this mode/role of operation.

Figure 5:
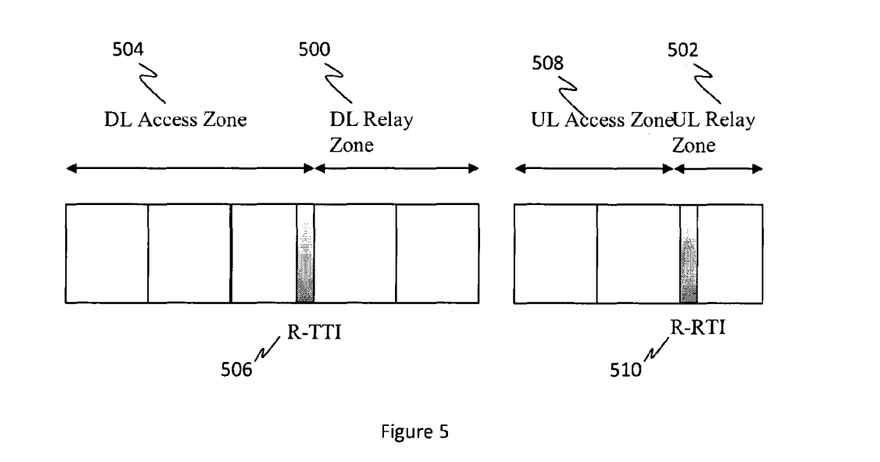
FIG. 5 shows a basic frame structure for a dual-role HR-BS during the RS Operation, in accordance to various embodiments.

The basic frame structure for a dual-role HR-BS during the RS Operation 404 is illustrated in FIG. 5. It should be understood that the sizes of DL Relay Zone (or period) 500 and UL Relay Zone (or period) 502, in terms of the number of subframes are flexible and may be 0.

The operation of the dual-role HR-BS in each of the zones or periods illustrated in FIG. 5 is as follows:

The dual-role HR-BS transmits DL messages to its subordinate AMSs/HR-MSs during DL Access Zone (or period) 504. At the end of the last subframe of the DL Access Zone (or period) 504, the HR-BS switches from transmitting to receiving mode. In order to do so, an R-TTI (Relay-Transmit-to-receive Transition Interval) time 506 may be inserted. The value of R-TTI may be calculated as follows:

$$R\text{-}TTI = 0 \text{ if } RTD/2 + Ta > BSTTG \quad [\text{Eqn. 1}]$$

$$R\text{-}TTI = Ts \text{ if } RTD/2 + Ta < BSTTG \quad [\text{Eqn. 2}]$$

where RTD is the round trip delay between the dual-role BS and the super-ordinate BS, BSTTG is the time needed for the dual-role BS to switch its transceiver from transmit to receive mode, Ts is the orthogonal frequency-division multiple access (OFDMA) symbol duration, and Ta is the timing advance of the frame boundary of the dual-role HR-BS, respective to the frame boundary of the super-ordinate HR-BS.

It should be understood that Ta is not defined in 802.16m-2011 systems. The value of Ta may be negotiated between the dual-role HR-BS and its super-ordinate HR-BS, taking also into account the need for the UL transmission from the dual-role HR-BS to be aligned with the UL frame boundary at the super-ordinate HR-BS.

In one example, both HR-BSs may adjust their timing (including value of Ta) so that R-TTI=0, i.e., no switching time needs to be inserted at the end of the last subframe in the DL Access Zone 504 of the dual-role HR-BS.

In case the value of R-TTI 506 is Ts (e.g., one OFDMA symbol), the dual-role HR-BS would not schedule DL transmissions to its subordinate 802.16-2009 MSs and 802.16m AMSs-2011 during the last subframe of the DL Access Zone 504. The dual-role HR-BS may still schedule DL transmissions to its 802.16n HR-MSs within this last subframe, provided that the information of R-TTI 506 insertion has been propagated to the subordinate 802.16.1a HR-MSs.

When transmitting in the DL Access Zone 504, the dual-role HR-BS may employ the same PHY-layer configurations as those used in the BS Operation 402 mode.

The dual-role HR-BS may receive from its super-ordinate HR-BS during the DL Relay Zone 500. The PHY-layer configuration for DL communication between the dual-role HR-BS and its super-ordinate HR-BS may be negotiated by the two HR-BSs.

The dual-role HR-BS may or may not communicate with its subordinate ARSs/HR-RSs during the DL Relay Zone 500.

In one example, the dual-role HR-BS may transmit DL data to its subordinate ARSs/HR-RSs during the first subframe of the DL Relay Zone 500. Prior to doing so, the dual-role HR-BS may negotiate with its super-ordinate HR-BS so that no DL data is transmitted from the super-ordinate HR-BS toward the dual-role HR-BS during the first subframe of the DL Relay Zone 500. When the dual-role HR-BS transmits DL data to its subordinate ARSs/HR-RSs, it may employ the same PHY-layer configuration as used in the DL Relay Zone 500 of BS Operation 402 mode. When this happens, the R-TTI 506 may not be inserted at the end the last subframe of the DL Access Zone 504, instead, such a switching interval may be inserted at the end of the first subframe of the DL Relay Zone 500.

In another example, the dual-role HR-BS may instruct its subordinate HR-RSs to transmit UL data during the DL Relay Zone 500 (in which the dual-role HR-BS receives from the super-ordinate HR-BS). While doing so, the HR-BS may instruct the transmitting HR-RSs to use the same PHY-layer configuration as used in the DL Relay Zone 500 of the super-ordinate HR-BS.

The dual-role HR-BS may receive UL messages from its subordinate AMSs/HR-MSs during UL Access Zone (or period) 508.

The dual-role HR-BS may transmit UL messages toward its super-ordinate HR-BS during the UL Relay Zone 502. The PHY-layer configuration for UL communication between the dual-role HR-BS and its super-ordinate HR-BS may be negotiated by the two HR-BSs.

The dual-role HR-BS may or may not communicate with its sub-ordinate ARSs/HR-RSs during the UL Relay Zone 502.

In one embodiment, the dual-role HR-BS may instruct its subordinate HR-RSs to receive DL messages transmitted by the dual-role HR-BS during the UL Relay Zone 502. While doing so, the HR-BS may instruct the transmitting HR-RSs to use the same PHY-layer configuration as used in the UL Relay Zone 502 of the super-ordinate HR-BS. Furthermore, if a Relay Receive-to-transmit Transition Interval (R-RTI) 510 is inserted in the first OFDMA symbol of the first subframe of the UL Relay Zone 502, the dual-role HR-BS may let its subordinate HR-RSs to be aware of this R-RTI 510 insertion so that subordinate HR-RSs can configure their respective receiving operation accordingly.

The BSTTG value between the DL and UL areas are fixed, so the value of R-RTI 510 may depend on Ta and RTD (as defined above). In particular:

$$R\text{-}RTI=0 \text{ if } Ta-RTD/2 > BSRTG \quad [\text{Eqn. 3}]$$

$$R\text{-}RTI=Ts \text{ if } Ta-RTD/2 < BSRTG \quad [\text{Eqn. 4}]$$

where BSRTG is the time needed for the dual-role BS to switch its transceiver from receive to transmit mode.

In one example, both HR-BSs may adjust their timing (including the value of Ta) so that R-RTI=0, i.e., no switching time needs to be inserted at the beginning of the first subframe in the UL Relay Zone 502 of the dual-role HR-BS.

In another example, the dual-role HR-BS may still receive UL messages from its subordinate ARS/HR-RS during the first subframe of the UL Relay Zone 502. Prior to doing so, the dual-role HR-BS may negotiate with its super-ordinate HR-BS so that no the super-ordinate HR-BS would not schedule the dual-role HR-BS to transmit any UL data during the first subframe of the UL Relay Zone 502. When subordinate ARS/HR-RS transmit messages to the dual-role HR-BS, the same PITY-layer configuration as used in the UL Relay Zone 502 of BS Operation 402 mode may be employed. When this happens, the R-RTI 510 may not be inserted at the beginning of the first subframe of the UL Access Zone 508, instead, such a switching interval may be inserted at the beginning of the second subframe (if available) of the UL Relay Zone 502.

Special Operation Configuration

A special operation configuration may include:

- The dual-role HR-BS always operate in RS Operation 404 mode (i.e., T_bs=0);
- During the DL and UL Access Zones 504, 508, the dual-role BS communicates with its subordinate MSs/AMSs/HR-MSs as described above in the BS Operation 402 and the RS Operation 404 modes;
- During the DL Relay Zone 500, the dual-role BS receives from its super-ordinate HR-BS and its subordinate HR-RSs as described above in the example of the RS Operation 404 mode;
- During the UL Relay Zone 502, the dual-role BS transmits towards its super-ordinate HR-BS and its subordinate HR-RSs as described above in the example of the RS Operation 404 mode.

Hybrid Automatic Repeat Request (HARQ) Support

Hybrid automatic repeat request (HARQ) signaling and timing in the DL/UL Access Zones 504, 508 for DL/UL connections between the dual-role BS and subordinate AMSs/HR-MSs may be the same as that specified in IEEE 802.16m-2011 requirements. This may be applicable to both BS Operation 402 mode and RS Operation 404 mode of the dual-role HR-BS.

For HARQ transmissions, the parameter T_ReTx_Interval defines the maximum allowable delay (in unit of frames) between two consecutive HARQ transmissions of the same data burst and is signaled in a 3-bit field of the Advanced Air Interface-System Configuration Descriptor (AAI-SCD) message, or a similar message to be defined for 802.16n systems. The dual-role HR-BS and its super-ordinate HR-BS may configure T_ReTx_Interval and the pattern of time-multiplexing between the BS Operation 402 mode and the RS Operation 404 mode so that the gap between two consecutive mode switches does not exceed T_ReTx_Interval.

When that is achieved, the HARQ signaling and timing in the DL Relay Zone 500 for DL connections from the dual-role HR-BS toward subordinate ARSs/HR-RSs and from the super-ordinate HR-BS toward the dual-role HR-BS may also be the same as that specified in 802.16m requirements. This may be applicable to both BS Operation 402 mode and RS Operation 404 mode of the dual-role HR-BS.

HARQ signaling and timing for UL transmissions from subordinate ARSs/HR-RSs toward the dual-role HR-BS may be affected when the dual-role HR-BS needs to receive from its super-ordinate HR-BS during a DL Relay Zone 500 (under the RS Operation 404 mode). When doing so, the dual-role HR-BS will not be able to transmit HARQ feedback toward its subordinate relay stations. To address and overcome this problem, in one example, the dual-role HR-BS may transmit HARQ feedback to its subordinate ARSs/HR-RSs during the first subframe of the DL Relay Zone 500 (when the dual-role HR-BS is in the RS Operation 404 mode). This follows the above-described example that allows the dual-role HR-BS to transmit DL messages toward subordinate ARSs/HR-RSs during the first subframe of the DL Relay Zone 500.

In another example, all on-going UL retransmission processes may be terminated when the dual-role HR-BS switches from the BS Operation 402 mode to the RS Operation 404 mode.

Multi-Hop Support

Figure 6:
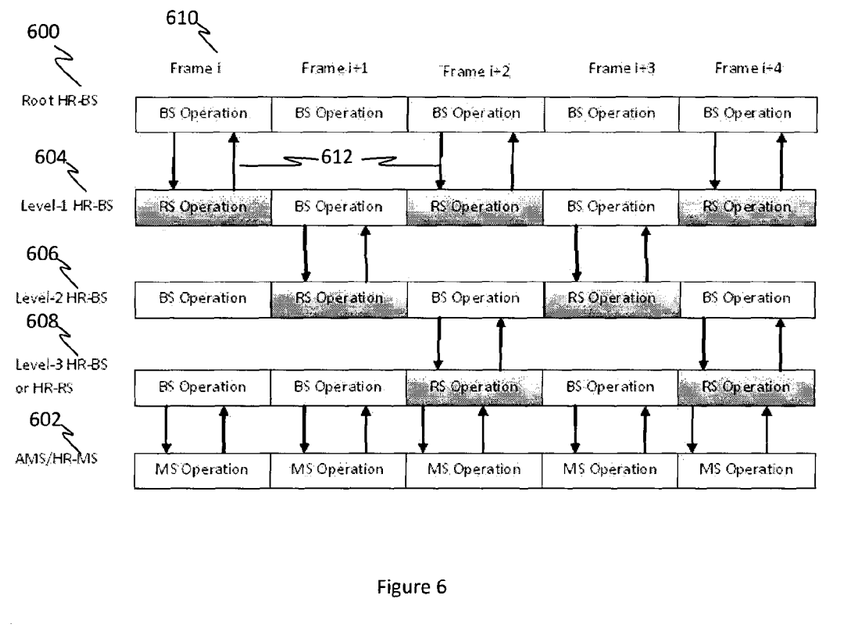
FIG. 6 shows a schematic diagram illustrating the support of multi-hop relay with dual-role HR-BSs, in accordance to various embodiments.

FIG. 6 shows a schematic diagram illustrating the support of multi-hop relay with dual-role HR-BSs.

To support multi-hop relaying from an HR-BS 600 toward an HR-MS (or AMS) 602, multiple dual-role HR-BSs 604, 606, 608 may be linked up, with their respective frame structure 610 illustrated in FIG. 6, where the arrows 612 indicate possible message transmissions from one network entity to another.

The HR-BS 600 may be also a dual-role HR-BS operating in the BS Operation 402 mode. The HR-BSs 600, 604, 606, 608 may refer to the base station 100 of FIG. 1.

When the dual-role HR-BS 604, 606, 608 follows the "Special Configuration" specified above, normal HARQ operation as specified in 802.16m systems may be supported between the dual-role HR-BS 604, 606, 608 and its super-ordinate HR-BS 600, as well as between the dual-role HR-BS 604, 606, 608 and its subordinate MSs/AMSs/HR-MSs/HR-RSs 602. It should be understood that subordinate ARSs may not be supported.

Enhanced Methods

The effectiveness of the examples described above may be enhanced.

For example, in the above examples, the timing advance Ta for the frame boundary of affected HR-BS may be set to 0.

In one exemplary enhanced approach, upon agreeing on the value of switching time R-TTI 506, the affected/dual-role HR-BS, for example, the base station 100 of FIG. 1 may:

Negotiate with the superordinate HR-BS (for example, the other base station 104 of FIG. 1) and perform the dual-role switching between the BS Operation 402 and the RS Operation 404, as described above, if R-TTI=0.

Negotiate with the superordinate HR-BS and perform a modified dual-role switching between the BS Operation 402 and RS Operation 404, as described below, if R-TTI=Ts.

When R-TTI=Ts, the affected HR-BS may operate in the following way:

The affected HR-BS changes its SA-preamble (Secondary Advanced (SA) preamble), i.e., IDCell, and possibly other relevant physical-layer parameters, so that it is viewed by legacy AMS/ARS as a normal Time-division Transmit/Receive (TTR) RS. It should be understood that in 802.16m-2011 systems, TTR ARSs have different SA-preamble, i.e., different IDCell, compared to other types of base stations.

The affected HR-BS still negotiates with its superordinate HR-BS a dual-role operation as illustrated in FIG. 4. However, the functioning of the affected HR-BS in the BS Operation 402 mode and RS Operation 404 mode would be different from the examples described above.

In particular,

BS Operation:

When assuming the BS Operation 402 mode, the affected HR-BS behaves like a normal (or standard) HR-BS for its subordinate relay stations (HR-RS). That means the affected HR-BS transmits to its subordinate HR-RS in the DL Relay Zone (or period) 500, and receive from its subordinate HR-RS in the UL Relay Zone (or period) 502. The affected HR-BS may not be able to communicate with its subordinate ARS, as these legacy relay stations may not understand the dual-mode operation of the affected HR-RS.

When assuming the BS Operation 402 mode, the affected HR-BS still behave like a normal (or standard) HR-RS for its subordinate mobile stations (MS/AMS/HR-MS). In particular, the subordinate MS/AMS/HR-MS detect the SA-preamble transmitted by the affected HR-BS and classify the HR-BS as a TTR HR-RS. That means the affected HR-BS only transmits DL data toward its subordinate mobile stations in the DL Access Zone (or period) 504 and receive UL data from its subordinate mobile stations in the UL Access Zone (or period) 508. Furthermore, as R-TTI=Ts, the affected HR-BS would not transmit on the last OFDM symbol of the last subframe in the DL Access Zone 504.

RS Operation:

When assuming the RS Operation 404 mode, the affected HR-BS communicates with its superordinate HR-BS. It may or may not communicate with its subordinate ARS/HR-RS and the specifications are as described in the examples above.

When assuming the RS Operation 404 mode, the affected HR-BS behaves like a normal (or standard) HR-RS for its subordinate mobile stations (MS/AMS/HR-MS). In particular, the subordinate MS/AMS/HR-MS detect the SA-preamble transmitted by the affected HR-BS and classify the HR-BS as a TTR HR-RS. That means the affected HR-BS only transmits DL data toward its subordinate mobile stations in the DL Access Zone 504 and receive UL data from its subordinate mobile stations in the UL Access Zone 508. Furthermore, as R-TTI=Ts, the affected HR-BS would not transmit on the last OFDM symbol of the last subframe in the DL Access Zone 504.

As no matter what operational mode (BS Operation 402 and RS Operation 404) the affected HR-BS assumes, it would always behave like a normal TTR HR-RS for its subordinate MS/AMS/HR-MS, the HARQ operation of these subordinate stations (in both downlink and uplink) may follow what specified in 802.16m systems for RS to MS operation.

A specific embodiment to implement the above approach in IEEE 802.16.1a standard is described as follow.

When the affected HR-BS establishing a TTR relay link with a serving HR-BS, the following actions may be carried out:

In a request message, the affected HR-BS reports its required switching gaps BSTTG and BSRTG to the serving HR-BS. Here, BSTTG is the minimum transmit-to-receive turnaround gap while BSRTG is the minimum receive-to-transmit turnaround gap required at the affected HR-BS. Based on the values of BSTTG and BSRTG, the two HR-BSs agree on the timing advance $T_a$ of the frame boundary of the affected HR-BS, relative to that of the serving HR-BS. The affected HR-BS can propose a value for $T_a$ in the request message, and the serving HR-BS can reply with a confirmed $T_a$ value in the corresponding response message. With the values of BSTTG, BSRTG, and $T_a$, the two HR-BSs may calculate shared values for the switching time R-TTI and R-RTI, based on the following equations:

$$\text{R-TTI}=0 \text{ if RTD}/2+T_a \geq \text{BSTTG} \qquad \text{[Eqn. 5]}$$

$$\text{R-TTI}=T_s \text{ if RTD}/2+T_a < \text{BSTTG} \qquad \text{[Eqn. 6]}$$

and $$\text{R-RTI}=0 \text{ if } T_a-\text{RTD}/2 \geq \text{BSRTG} \qquad \text{[Eqn. 7]}$$

$$\text{R-RTI}=T_s \text{ if } T_a-\text{RTD}/2 < \text{BSRTG}, \qquad \text{[Eqn. 8]}$$

where RTD is the round trip delay between the affected HR-BS and the serving HR-BS and $T_s$ is the OFDMA symbol duration.

Also included in the request message sent by affected HR-BS may be a dual-mode switching pattern ($T_{bs}$, $T_{rs}$), as described below. This pattern may be confirmed in the corresponding response message sent by the serving HR-BS.

As an alternative to the above described above actions, certain parts of the signaling between the two HR-BSs may be carried out through backhaul, i.e., prior to (and in preparation for) the backhaul failure at affected HR-BS.

The affected HR-BS is able to switch between the BS Operation and the RS Operation in a frame-by-frame basis. The role switching pattern may be periodic, with the dual-role HR-BS assuming the BS Operation for $T_{bs}$ consecutive frames, followed by the RS Operation for $T_{rs}$ consecutive frames. $T_{bs}$ may be set to 0. The values of $T_{bs}$, $T_{rs}$ may be negotiated between the affected/dual-role HR-BS and its serving HR-BS. The configuration may be altered during operation through appropriate control message.

The operation of affected HR-BS in each mode, i.e., the BS Operation and the RS Operation, may depend on the value of switching interval R-TTI, which is specified below.

When R-TTI=0, the affected HR-BS keeps its original PHY-layer configuration, including IDCell, frame configuration, and FFR pattern. In addition, the affected HR-BS sets the AAI_Relay_zone_AMS_allocation_indicator field in AAI-SCD and AAI-ARS-CONFIG-CMD messages (defined in IEEE 8-2.16-2011) to 0b0. The operation of the affected/dual-role HR-BS may be described as follows.

In BS Operation Mode:

The affected/dual-role HR-BS only communicates with its subordinate AMS/HR-MS/HR-RS and is not available to receive from or transmit to its serving HR-BS.

The manner in which the affected/dual-role HR-BS controls and communicates with its subordinate AMS/HR-MSs/HR-RSs is the same as that of a normal HR-BS. The serving HR-BS is not expected to know the specific configuration of the dual-role HR-BS during the BS Operation. When the affected/dual-role HR-BS transmits to or receives from its subordinate AMS/HR-MS/HR-RS during the BS Operation, it does so independently to the serving HR-BS.

The affected/dual-role HR-BS transmits a control message to tell the subordinate HR-RSs when the HR-BS switches to the RS Operation.

In RS Operation Mode:

The affected/dual-role HR-BS communicates with the serving HR-BS and with the subordinate AMS/HR-MS. It may or may not communicate with its subordinate HR-RS during this mode of operation. The frame structure of the affected HR-BS is divided into DL Access zone, DL Relay zone, UL Access zone, and UL Relay zone. It should be appreciated that as R-TTI=0, no time gap needs to be inserted into the last OFDM symbol of the last subframe in the DL Access zone.

As the affected HR-BS still transmits the same SA-Preamble, the subordinate AMS/HR-MS are oblivious to or unaware of the mode change of the affected HR-BS. The affected HR-BS continues to transmit to its subordinate AMS/HR-MS in the DL Access zone, and receive from its subordinate AMS/HR-MS in the UL Access zone.

The affected/dual-role HR-BS receives from and transmits to its serving HR-BS during the DL Relay zone and UL Relay zone, respectively. The PHY-layer configuration for DL/UL Relay zones may be sent by the serving HR-BS toward the affected HR-BS in a control message.

The affected/dual-role HR-BS may communicate with its subordinate HR-RSs in the following ways:

The affected/dual-role HR-BS may instruct its subordinate HR-RSs to transmit UL data during the DL Relay zone, i.e., when the affected/dual-role HR-BS also receives from the serving HR-BS. While doing so, the affected/dual-role HR-BS instructs, through a control message, the transmitting HR-RSs to use the same PHY-layer configuration as used in the DL Relay zone of the serving HR-BS.

The affected/dual-role HR-BS may instruct its subordinate HR-RSs to receive DL messages during the UL Relay zone, i.e., when the affected/dual-role HR-BS also transmits to the serving HR-BS. While doing so, the HR-BS instructs, through a control message, the transmitting HR-RSs to use the same PHY-layer configuration as used in the UL Relay zone of the serving HR-BS. Furthermore, if an R-RTI=$T_s$ is inserted in the first OFDMA symbol of the first subframe of the UL Relay zone, the dual-role HR-BS lets its subordinate HR-RSs be aware of this insertion.

When R-TTI=$T_s$, the affected HR-BS changes its IDCell, i.e., it picks one of the SA-Preamble sequences (and possibly new preamble carrier index) that are allocated for TTR ARS. The operation of the affected/dual-role HR-BS may be described as follows.

In BS Operation Mode:

The affected/dual-role HR-BS only communicates with its subordinate AMS/HR-MS/HR-RS stations and is not available to receive from or transmit to its serving HR-BS.

The affected/dual-role HR-BS behaves like a normal HR-RS for its subordinate AMS/HR-MS. The subordinate AMS/HR-MS detect the SA-preamble transmitted by the affected/dual-role HR-BS and classify the HR-BS as a TTR HR-RS. In response, the affected HR-BS only transmits DL data toward its subordinate AMS/HR-MS in the DL Access zone and receives UL data from its subordinate AMS/HR-MS in the UL Access zone. Furthermore, as R-TTI=$T_s$, the affected HR-BS may not transmit on the last OFDM symbol of the last subframe in the DL Access zone. The information regarding R-TTI=$T_s$ may be transmitted in the SFH SP2 toward subordinate AMS/HR-MS.

The affected HR-BS behaves like a normal HR-BS for its subordinate HR-RS. That means the affected HR-BS transmits to its subordinate HR-RS in the DL Relay zone, and receives from its subordinate HR-RS in the UL Relay zone.

In RS Operation Mode:

The affected HR-BS communicates with its serving HR-BS. It may or may not communicate with its subordinate HR-RS in the mode of operation, and the specifications are as described for the case when R-TTI=0.

The affected/dual-role HR-BS behaves like a normal HR-RS for its subordinate AMS/HR-MS. The subordinate AMS/HR-MS detect the SA-preamble transmitted by the affected/dual-role HR-BS and classify the HR-BS as a TTR HR-RS. In response, the affected HR-BS only transmits DL data toward its subordinate AMS/HR-MS in the DL Access zone and receives UL data from its subordinate AMS/HR-MS in the UL Access zone. Furthermore, as R-TTI=$T_s$, the affected HR-BS may not transmit on the last OFDM symbol of the last subframe in the DL Access zone. The information regarding R-TTI=$T_s$ may be transmitted in the SFH SP2 toward subordinate AMS/HR-MS.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

The invention claimed is:

1. A base station comprising:
a transceiver configured to communicate with another base station using a radio resource, wherein the radio resource is allocated to the base station to serve communication devices located in a radio cell operated by the base station, wherein the base station operates in a communication network and is configured to access a core network of the communication network through the other base station, wherein the base station further comprises:
a controller configured to switch between a first mode and a second mode; and
wherein in the first mode, the radio resource is used by the base station to serve the communication devices; and
wherein in the second mode, the transceiver is configured to communicate with the other base station in order to access the core network of the communication network, and
wherein the transceiver is configured to send to at least one of the communication devices or the other base station a control message comprising information on when the base station operates in the first mode or on when the base station operates in the second mode.

2. The base station as claimed in claim 1, wherein the controller is configured to switch between the first mode and the second mode in a frame-by-frame basis.

3. The base station as claimed in claim 1, wherein the controller is configured to switch between the first mode and the second mode in a periodic manner.

4. The base station as claimed in claim 1, further comprising:
a determiner configured to determine whether to switch in the first mode or the second mode.

5. The base station as claimed in claim 1, wherein the transceiver is configured to serve the communication devices using the radio resource in the second mode.

6. The base station as claimed in claim 1, wherein the control message is sent when the base station enters the communication network or when the base station is operating in the first mode or when base station is operating in the second mode.

7. The base station as claimed in claim 6, wherein the control message is sent to the other base station through a backhaul connection of the communication network.

8. The base station as claimed in claim 6, wherein the control message is sent via the radio resource.

9. The base station as claimed in claim 1, wherein the communication devices comprise communication terminals or relay stations or both.

10. The base station as claimed in claim 9, wherein the communication terminals comprise mobile stations or subscriber stations or both.

11. The base station as claimed in claim 9, wherein the communication terminals comprise at least one of 802.16 subscriber stations, 802.16 mobile stations, 802.16m mobile stations, or 802.16.1a mobile stations.

12. The base station as claimed in claim 9, wherein the relay stations comprise 802.16.1a relay stations.

13. The base station as claimed in claim 9, wherein in the second mode, the transceiver is configured to transmit a downlink (DL) message to the communication terminals during a downlink (DL) access period.

14. The base station as claimed in claim 13, wherein the transceiver is configured to receive the DL message from the other base station during a downlink (DL) relay period.

15. The base station as claimed in claim 14, wherein the transceiver is configured to transmit downlink (DL) data to the relay stations or to transmit to the relay stations a message indicating that uplink (UL) data is to be transmitted during the downlink (DL) relay period.

16. The base station as claimed in claim 13, wherein in the second mode, the transceiver is configured to receive an uplink (UL) message from the communication devices during an uplink (UL) access period or an uplink (UL) relay period.

17. The base station as claimed in claim 16, wherein the transceiver is configured to transmit the UL message to the other base station or to transmit to the relay stations a further message indicating that the DL message is to be received during the UL relay period.

18. The base station as claimed in claim 1, wherein the other base station is configured to operate another radio cell.

19. The base station as claimed in claim 18, wherein the other radio cell is a neighbouring cell of the radio cell.

20. A method of operating a base station, the method comprising:
communicating, via a transceiver of the base station, with another base station using a radio resource, wherein the radio resource is allocated to the base station to serve communication devices located in a radio cell operated by the base station,
operating the base station in a communication network and allowing the base station to access a core network of the communication network through the other base station,
switching between a first mode and a second mode,
wherein in the first mode, the radio resource is used by the base station to serve the communication devices; and
wherein in the second mode, the transceiver is configured to communicate with the other base station in order to access the core network of the communication network, and
sending, via the transceiver, to at least one of the communication devices or the other base station a control message comprising information on when the base station operates in the first mode or on when the base station operates in the second mode.

* * * * *